(12) United States Patent
Lindroos et al.

(10) Patent No.: US 8,571,320 B2
(45) Date of Patent: Oct. 29, 2013

(54) METHOD AND APPARATUS FOR PICTORIAL IDENTIFICATION OF A COMMUNICATION EVENT

(75) Inventors: Sanna Lindroos, Tampere (FI); Päivi Jokinen, Tampere (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 1178 days.

(21) Appl. No.: 11/302,509

(22) Filed: Dec. 12, 2005

(65) Prior Publication Data
US 2007/0133875 A1    Jun. 14, 2007

(51) Int. Cl.
    *G06K 9/00*    (2006.01)
(52) U.S. Cl.
    USPC ........................................................ 382/181
(58) Field of Classification Search
    USPC ............................... 382/181, 231, 100
    See application file for complete search history.

(56) References Cited

U.S. PATENT DOCUMENTS

| 7,149,353 | B2 * | 12/2006 | Siegel et al. | 382/190 |
| 7,515,770 | B2 * | 4/2009 | Fukada | 382/284 |
| 7,734,996 | B2 * | 6/2010 | Hirata | 715/201 |
| 2003/0041056 | A1 * | 2/2003 | Bossemeyer et al. | 707/3 |
| 2004/0101198 | A1 * | 5/2004 | Barbara | 382/181 |
| 2004/0143603 | A1 * | 7/2004 | Kaufmann et al. | 707/104.1 |
| 2005/0065791 | A1 * | 3/2005 | Kim | 704/231 |
| 2005/0129308 | A1 * | 6/2005 | Comfort et al. | 382/165 |
| 2006/0004914 | A1 * | 1/2006 | Kelly et al. | 709/219 |

FOREIGN PATENT DOCUMENTS

WO    WO2005/027092    *    3/2005

* cited by examiner

*Primary Examiner* — Edward Park

(57) ABSTRACT

The specification and drawings present a new method, apparatus and software product for pictorial identification of a communication event using speech or text recognition in an electronic device. The communication can be (but is not limited to) a telephone call, an electronic mail message, MMS, SMS, an instant message, etc. Words from the communication event are identified using the speech or text recognition by the electronic device and at least one picture out of a library of reference pictures is identified by comparing the identified words with the key picture words using a predetermined criterion. Color background of the identified standard picture can be also identified using the identified words and a further predetermined criterion. The identified picture can be displayed during the communications event or can be stored so the user can identify the topic of the communication event later on.

19 Claims, 2 Drawing Sheets

METHOD AND APPARATUS FOR PICTORIAL IDENTIFICATION OF A COMMUNICATION EVENT

FIELD OF THE INVENTION

This invention relates to pictorial identification of a communication event (e.g., a phone call, SMS, MMS, etc.) in an electronic device.

BACKGROUND ART

Users of phones (e.g., mobile phones) can only see limited specific information about a phone call when they look up the call log using, e.g., a phone log feature. Usually the phone call information stored in the phone may include time, duration of the call, the identity of the user who called, etc. Currently, no visual information identifying the phone call is provided by the phone log feature of the phones.

DISCLOSURE OF THE INVENTION

According further to the first aspect of the invention, the method for a pictorial identification of a communication event in an electronic device, comprises the steps of: starting a communication event using the electronic device; identifying words from the communication event by the electronic device using a speech or a text recognition; and identifying by the electronic device at least one picture out of a library of reference pictures by comparing the identified words with the key picture words, wherein each at least one picture out of the library of the reference pictures is uniquely identified by at least one of the key picture words.

Further according to the first aspect of the invention, the library of reference pictures and the key picture words may be stored in the electronic device.

Still further according to the first aspect of the invention, the invention may further comprise the step of: identifying by the electronic device a background color out of a library of reference colors for the identified at least one picture by comparing the identified words with the key color words using a further predetermined criteria, wherein each background color out of the library of the reference colors is uniquely identified by at least one of the key color words. Further, if the background color is not identified, a predefined default background color may be used for the identified standard picture. Still further, the library of reference colors and the key color words may be stored in the electronic device. Yet still further, the invention may comprise at least one step out of:
displaying the identified picture with the identified background color or the predefined default background color on a display of the electronic device during the communication event; and storing the identified picture with the identified background color or with the predefined default background color in the electronic device after the communication event is terminated. Still further yet, the library of reference colors or the key color words may be altered by a user of the electronic device. Yet still further yet, the predetermined criterion may be altered by a user of the electronic device.

According further to the first aspect of the invention, the invention may comprise at least one step out of: displaying the identified picture on a display of the electronic device during the communication event, and storing the identified picture in a the electronic device after the communication event is terminated.

According still further to the first aspect of the invention, the communication event may be one event out of: telephone call; an electronic mail message, a multimedia messaging service (MMS) message, a short message service (SMS) message, and an instant message.

According further still to the first aspect of the invention, the library of reference pictures and the key picture words may be altered by a user of the electronic device.

According yet further still to the first aspect of the invention, the predetermined criterion may be altered by a user of the electronic device.

According to a second aspect of the invention, a computer program product comprises: a computer readable storage structure embodying computer program code thereon for execution by a computer processor with the computer program code characterized in that it includes instructions for performing the steps of the first aspect of the invention indicated as being performed by the electronic device.

According to a third aspect of the invention, an electronic device capable of a pictorial identification of a communication event, comprises: means for starting a communication event; a speech/text recognition block, for identifying words from the communication event using a speech or a text recognition and for providing the identified words; and a picture and color comparator, responsive to the identified words, for identifying at least one picture out of a library of reference pictures by comparing the identified words with the key picture words using a predetermined criteria, wherein each at least one picture out of the library of the reference pictures is uniquely identified by at least one of the key picture words.

According further to the third aspect of the invention, the picture and color comparator may be for identifying a background color out of a library of reference colors for the identified at least one picture by comparing the identified words with the key color words using a further predetermined criteria, wherein each background color out of the library of the reference colors may be uniquely identified by at least one of the key color words. Further, if the background color is not identified, a predefined default background color may be used for the identified standard picture. Further yet, the electronic device may further comprises at least one out of: a display, for displaying the identified picture with the identified background color or the predefined default background color during the communication event, and a communication event storage area, for storing the identified picture with the identified background color or with the predefined default background color after the communication event is terminated.

Further according to the third aspect of the invention, the communication event may be one event out of: telephone call; an electronic mail message, a multimedia messaging service (MMS) message, a short message service (SMS) message, and an instant message.

Still further according to the third aspect of the invention, the electronic device may further comprise at least one out of: a display, for displaying the identified picture during the communication event, and a communication event storage area, for storing the identified picture after the communication event is terminated.

According further to the third aspect of the invention, the electronic device may be a computer, a communication device, a wireless communication device, a potable electronic device, a mobile electronic device or a mobile phone.

BRIEF DESCRIPTION OF THE DRAWINGS

For a better understanding of the nature and objects of the present invention, reference is made to the following detailed description taken in conjunction with the following drawings, in which.

MODES FOR CARRYING OUT THE INVENTION

Figure 1:
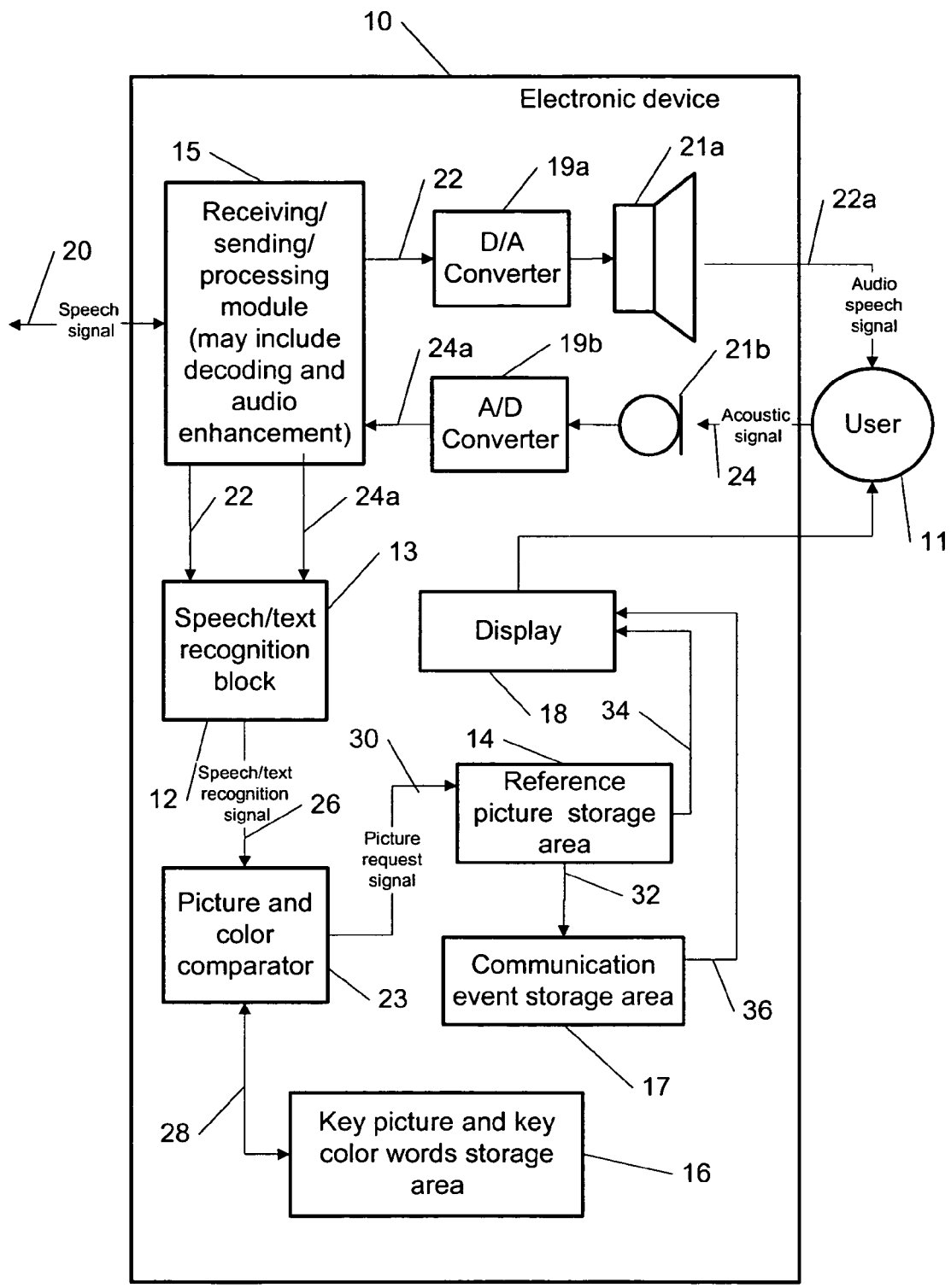
FIG. 1 is a block diagram of an electronic device for a pictorial identification of a communication event (e.g., a phone call) using a speech or a text recognition, according to an embodiment of the present invention.

A new method, apparatus and software product are presented for pictorial identification of a communication event using speech or text recognition in an electronic device. The communication event can be (but is not limited to) a telephone call, an electronic mail message, a multimedia messaging service (MMS) message, a short message service (SMS) message, an instant message, etc. The electronic device can be (but is not limited to) a communication device, a wireless communication device, a potable electronic device, a mobile electronic device, a mobile phone, a computer, etc.

According to an embodiment of the present invention, during a communication event (e.g., a phone call), words from the communication event are identified by the electronic device using a speech or text recognition, and at least one picture (or an image) out of a library of reference pictures, e.g., stored in the electronic device, is identified by comparing the identified words with the key picture words (also possibly stored in said electronic device), wherein each at least one picture out of the library of the reference pictures is uniquely identified by at least one of the key picture words. The communication event can be in a form of a speech (e.g., a phone call) or in a form of a text. Thus, according to embodiment of the present invention, the electronic device can be provided with speech and/or text recognition means.

Moreover, according to a further embodiment of the present invention, a background color for the identified at least one picture (it is noted that different elements in the picture still can have different colors) can be further identified by the electronic device out of a library of reference colors by comparing the identified words with the key color words using a further predetermined criteria (e.g., the library of reference colors and the key color words also can be stored in the electronic device), wherein each background color out of the library of the reference colors is uniquely identified by at least one of the key color words. Further, if the background color is not identified during the communication event, a predefined default background color can be used for the identified standard picture.

Thus, after the at least one picture, without the background color, with the background color or with the predefined default background color, is identified, this picture can be displayed on a display of the electronic device during the communication event, and/or it can be stored in the electronic device after the communication event is terminated. For example, in case of a phone conversation, the picture can be included in a phone log of the electronic device or it can be a part of a Gallery or a LifeBlog, thus the user of the electronic device can easily identify later on what was the topic of the phone conversation.

For example, two teenage girls can be talking about boys, school, horses and other hobbies during a phone call, and thus at the end of the conversation they can have a displayed picture of their conversation including all or some of those elements randomly or in a timeline on the picture. The displayed picture can also have a colored background, if different colors were mentioned during the phone call, e.g., words like bright, cold, dim, dull, etc.

Moreover, it is noted that according to further embodiment of the present invention, it can be more than one, i.e., multiple pictures (with appropriate color backgrounds) identified during the communication event. The multiple identified pictures may correspond to different key picture words. These multiple identified pictures can be also displayed on the display of the electronic device during the communication event, and/or it can be stored in the electronic device after the communication event is terminated. Furthermore, the user can select a limited number of pictures out of these multiple identified pictures for displaying and/or storing by using predefined rules, e.g., frequency (i.e., repetition) of use of different key picture words during the communication event. Thus, the "final painting" identifying the communication event, stored in the electronic device after the communication event is terminated, can comprise multiple pictures corresponding to different key picture words identified by the electronic device during the communication event, according to embodiments of the present invention as described above.

According to further embodiments of the present invention, the library of reference pictures, the library of reference colors for each of the standard pictures, the key picture words and/or the key color words can be altered by a user of said electronic device by adding or deleting in the electronic device. Also, the predetermined criterion and/or the further predetermined criterion (i.e., the rules for matching the recognized words with standard pictures and standard background colors) and can be altered by a user of the electronic device. For example, the standard pictures can be sent as MMS to the electronic device or they can be fetched from the gallery of images by using pattern recognition systems.

It is noted that there is no need for a network connection for implementing the embodiments of the present invention (except facilitating a communication event itself). In other words, the embodiments of the present invention can be performed only by the electronic device. Also according to an embodiment of the present invention, the identified pictures by the electronic device can be shared with other users who were involved in the communication event during the event via, e.g., shared whiteboard.

Thus, for instance, the speech and/or text recognition, in addition to a typical mobile phone (or other electronic devices) features, could provide new innovative ways of using the phone fun. A normal call could be enhanced to a fun feature that gives surprises in every use: pictures of your phone calls. Instead of recording the conversation, an "annotation" of the discussed issues could be provided by utilizing the speech recognition and/or text recognition means and imaging features of the phone. Thus, the users could "view" the discussion from the phone log.

FIG. 1 shows one example among other possible scenarios of a block diagram of an electronic device 10 for a pictorial identification of a communication event (e.g., a phone call) using the speech or a text recognition, according to an embodiment the present invention. The electronic device 10 can be, e.g., a communication device, a wireless communication device, a potable electronic device, a mobile electronic device, a mobile phone, a computer, etc.

A receiving/sending/processing module 15 (which can include, besides receiver, transmitter, CPU, etc., also decoding and audio enhancement means) receives or sends a speech signal 20 (or it can also send or receive the e-mail message, the MMS message, the SMS message, the instant message, etc.). When the speech signal 20 is received, the block 15 generates the received signal 22 which is further provided to the user 11 as an audio speech signal 22*a* using a D/A (digital-to-analog) converter 19*a* and a speaker 21*a*. Also, the block 15 provides the signal 22 to the speech/text recognition block 13. Still further, the block 13 receives the digital microphone signal 24*a* generated by converting an acoustic (speech) signal 24 from the user 11 by a microphone 21*b* and by an A/D (analog-to-digital) converter 19*b*.

According to a further embodiment of the present invention, the block 13 identifies words from a phone conversation (or in general, from the communication event) using the signals 22 and 24*a* by a speech recognition technique (or a text recognition technique if the communication event uses the text such as electronic mail, SMS, MMS, instant message, etc.) and provides the identified words to a picture and color comparator 23 using a speech/text recognition signal 26. The picture and color comparator 23, in response to the speech/text recognition signal 26 comprising the identified words, further identifies at least one picture by comparing the identified words with the key picture words, wherein each at least one picture out of the library of the reference pictures is uniquely identified by at least one of the key picture words. The key picture words can be stored in a library of key picture words and key colors storage area 16 and can be retrieved by the block 23 using the signal 28.

Furthermore, according to a further embodiment of the present invention, a picture and color comparator 23 can be used for optionally identifying a background color out of a library of reference colors for the identified at least one picture by comparing the identified words with the key color words using a further predetermined criteria, wherein each background color out of the library of the reference colors is uniquely identified by at least one of the key color words. If the background color is not identified, a predefined default background color can be used for said identified standard picture. The key color words can be stored in a key picture and color words storage area 16 and can be retrieved by the block 23 using the signal 28 as well.

According to further embodiment of the present invention, after identifying the at least one picture (with or without the background color or with the default background color), the block 23 provides a picture request signal 30 to at least one picture storage area 14 and the identified at least one picture possibly with the identified or default background color is displayed on the display 18 using the signal 34, so the user 11 can view the image of the identified at least one picture during the phone conversation and/or stored in a communication event storage area 17 (e.g., to be included in a phone log), so the user 11 of the electronic device 10 can easily identify later on what was the topic of the phone conversation, using the signal 36.

Figure 2:
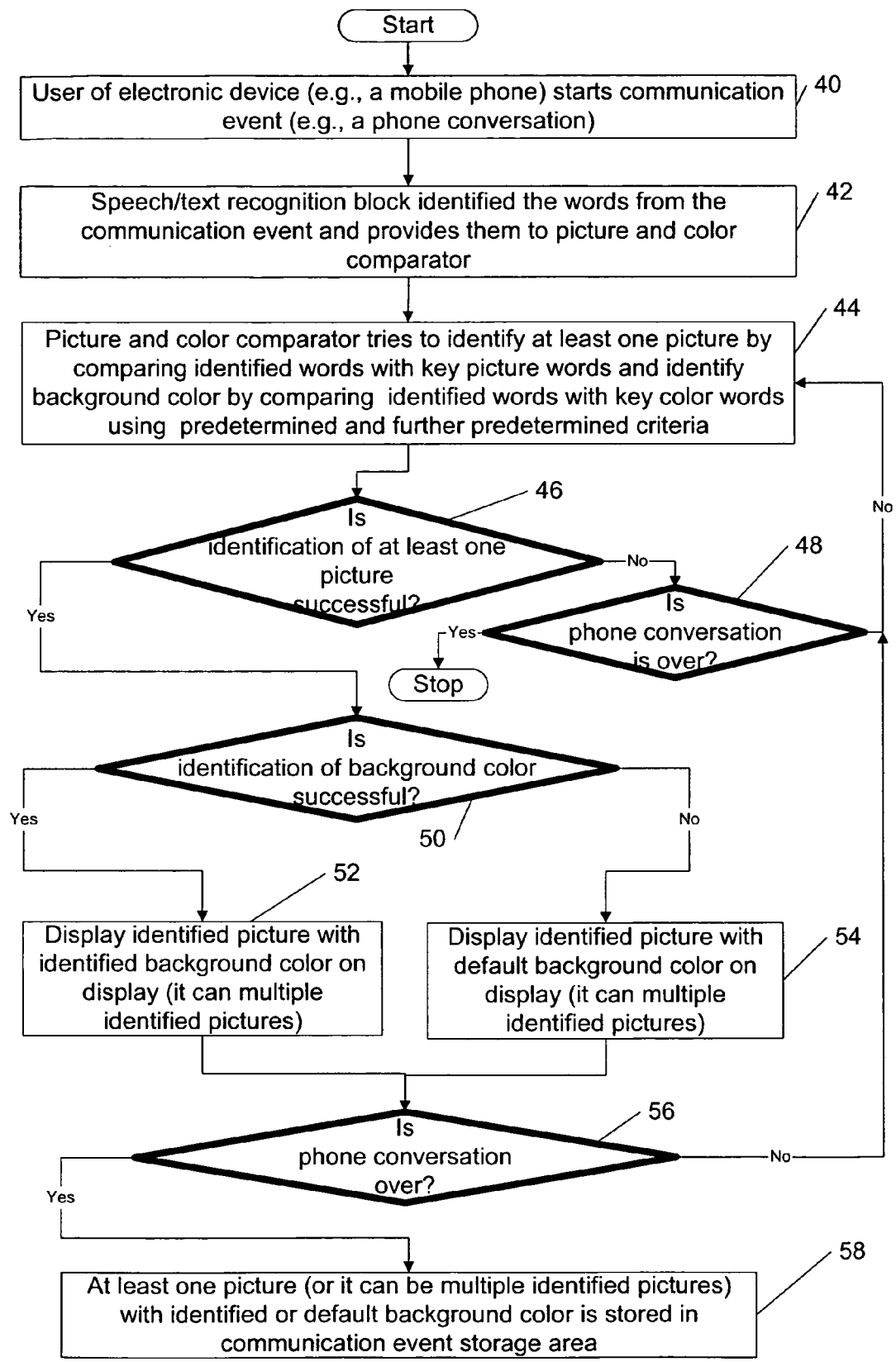
FIG. 2 is a flow chart demonstrating a performance of an electronic device for a pictorial identification of a communication event (e.g., a phone call) using a speech or a text recognition, according to an embodiment of the present invention.

FIG. 2 is a flow chart demonstrating a performance of the electronic device 10 for the pictorial identification of a communication event (e.g., a phone call) using the speech or text recognition, according to an embodiment of the present invention.

The flow chart of FIG. 2 only represents one possible scenario among others. In a method according to the first embodiment of the present invention, in a first step 40, the user 11 of the electronic device (e.g., a mobile phone) 10 starts a communication event (e.g., a phone call).

In a next step 42, the speech/text recognition block 13 identifies the words from the communication event using the speech or text recognition and provides the identified words (using the signal 26) to the picture and color comparator 23. In a next step 44, the picture and color comparator 23 tries to identify at least one picture by comparing the identified words with the key picture words and tries to identify a background color by comparing the identified words with the key color words using the predetermined and further predetermined criteria In a next step 46, it is ascertained whether the identification of the at least one picture is successful. If that is not the case, the process goes to step 48. In step 48, it is ascertained whether the phone conversation is over? If that is the case, the process stops. If, however, it is determined that the phone conversation is still on, the process goes back to step 44.

If, however, it is determined in step 46 that the identification of the at least one picture is successful, in a next step 50, it is ascertained whether the identification of the background color is successful. If that is the case, in a step 52, the identified picture with the identified background color is displayed on the display 18. If, however, it is determined that the identification of the background color is not successful, in a next step 54, the identified picture with the default background color is displayed on the display 18.

After step 52 or step 54, in a next step 56, it is ascertained whether the phone conversation is over. If that is not the case, the process goes back to step 44. If, however, it is determined that the phone conversation is over, in a next step 58, the at least one picture with the identified or default background color is stored in the communication event storage area 17, so the user 11 of the electronic device 10 can easily identify later on what was the topic of the phone conversation.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:
   initiating, by a first device, a communication event comprising speech, text, or both speech and text with a second device via a network connection;
   identifying, by said first device, words from said communication event using at least one of speech recognition and text recognition during the communication event, said identified words comprising words received via a user interface of said first device and words received via said network connection from said second device;
   identifying, by said first device, at least one picture from a library of reference pictures stored in said first device by comparing said identified words with a plurality of key picture words during the communication event, each of the at least one picture in the library of the reference pictures corresponding to at least one of the key picture words; and
   storing said at least one picture identified from said library in the first device such that a topic of the communication event is associated with the stored at least one picture.

2. The method of claim 1, further comprising:
   the first device identifying and storing a background color out of a library of reference colors for the identified at least one picture by comparing said identified words with key color words, wherein each background color out of the library of the reference colors is uniquely identified by at least one of the key color words to facilitate identification of said topic of the communication event by displaying said at least one stored picture with said stored background color.

3. The method of claim 2, wherein, if said background color is not identified by the first device, a predefined default background color is used by the first device for said identified standard picture.

4. The method of claim 2, wherein said library of reference colors and said key color words are stored in said first device.

5. The method of claim 2, further comprising at least one of:
the first device displaying said identified picture with said identified background color or said predefined default background color on said display of said first device during said communication event; and
the first device storing said identified picture with said identified background color or with said predefined default background color in said first device after said communication event is terminated.

6. The method of claim 2, wherein said library of reference colors or said key color words can be altered via said user interface of said first device.

7. The method of claim 2, wherein said comparing said identified words with key color words is based on a predetermined criterion that can be altered via said user interface of said first device.

8. The method of claim 1, further comprising at least one of:
the first device displaying said identified picture on a display of said first device during said communication event, and
the first device storing said identified picture in said first device after said communication event is terminated.

9. The method of claim 1, wherein said communication event is one event out of:
a telephone call,
an electronic mail message,
a multimedia messaging service message,
a short message service message, and
an instant message.

10. The method of claim 1, wherein said library of reference pictures and said key picture words can be altered via said user interface of said first device.

11. A non-transitory computer readable medium stored with code thereon for execution by a computer processor in the first device wherein said code includes instructions for performing the method of claim 1 by the first device.

12. The method of claim 1, further comprising the first device identifying more than one picture out of the library from corresponding identified words and storing said more than one picture identified out of said library after the communication event in said communication log of communication events in association with a timeline displayable on said first device.

13. An apparatus, comprising a processor and a memory including computer program code, the memory and the computer program code configured to, with the processor, cause the apparatus at least to perform the following acts:
identify a word selected from among words from a communication event facilitated by a network connection with another apparatus using speech recognition, text recognition, or both, during the communication event and for providing the identified word, said words comprising words received via said network connection from said other apparatus and words received via a user, interface of said apparatus;
identify a picture out of a library of reference pictures by comparing said identified word with picture words identifying said reference pictures in said library during the communication event, wherein each reference picture in the library of the reference pictures is identified by a unique picture word; and
store said identified picture after the communication event in a communication log of communication events such that a topic of the communication event is associated with the stored at least one picture.

14. The apparatus of claim 13, wherein said processor and said memory with the program code are configured to cause said apparatus to identify and store a background color out of a library of reference colors for the identified picture by comparing said identified word with color words, wherein each background color out of the library of reference colors is uniquely identified by at least one color word to facilitate identification of said topic of the communication event by said apparatus later retrieving and displaying said at least one stored picture with said stored background color.

15. The apparatus of claim 14, wherein, if said background color is not identified, said processor and said memory with the program with code are configured to cause the apparatus use a predefined default background color for said identified picture.

16. The apparatus of claim 14, wherein said processor and said memory with the program with code are configured to cause said apparatus to display said stored picture with said identified background color.

17. The apparatus of claim 13, wherein said speech communication event is one event out of:
a telephone call,
an electronic mail message,
a multimedia messaging service message,
a short message service message, and
an instant message.

18. The apparatus of claim 13, wherein said apparatus is a computer, a communication device, a wireless communication device, a portable electronic device, a mobile electronic device or a mobile phone.

19. The apparatus of claim 13, said memory and the computer program code configured to, with the processor, cause the apparatus to identify more than one picture out of the library from corresponding identified words and to store said more than one picture identified out of said library after the communication event in a communication log of communication events in association with a timeline displayable on said apparatus.

* * * * *

UNITED STATES PATENT AND TRADEMARK OFFICE
CERTIFICATE OF CORRECTION

PATENT NO. : 8,571,320 B2
APPLICATION NO. : 11/302509
DATED : October 29, 2013
INVENTOR(S) : Lindroos et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1305 days.

Signed and Sealed this
Twenty-third Day of May, 2017

Michelle K. Lee
*Director of the United States Patent and Trademark Office*